United States Patent
Hill et al.

(10) Patent No.: US 9,744,430 B2
(45) Date of Patent: Aug. 29, 2017

(54) UNIBODY SNOWBOARD

(71) Applicant: Aloha Products LLC, Fremont, CA (US)

(72) Inventors: Doug Hill, Fremont, CA (US); Jared Hill, Jackson, CA (US)

(73) Assignee: ALOHA PRODUCTS LLC, Fremont, CA (US)

( * ) Notice: Subject to any disclaimer, the term of this patent is extended or adjusted under 35 U.S.C. 154(b) by 0 days.

(21) Appl. No.: 14/924,250

(22) Filed: Oct. 27, 2015

(65) Prior Publication Data

US 2017/0113120 A1   Apr. 27, 2017

(51) Int. Cl.
  *A63C 5/12* (2006.01)
  *A63C 5/03* (2006.01)
  *B32B 37/12* (2006.01)
  *B32B 7/12* (2006.01)

(52) U.S. Cl.
  CPC ............ *A63C 5/126* (2013.01); *A63C 5/03* (2013.01); *B32B 7/12* (2013.01); *B32B 37/12* (2013.01); *B32B 2323/04* (2013.01)

(58) Field of Classification Search
  CPC .. A63C 5/126; A63C 5/03; A63C 5/12; A63C 5/128
  See application file for complete search history.

(56) References Cited

U.S. PATENT DOCUMENTS

| | | | | |
|---|---|---|---|---|
| 6,352,268 B1* | 3/2002 | Peart | ...... | A63C 5/044 280/14.21 |
| 6,450,512 B1* | 9/2002 | Carr | ...... | A63C 5/03 16/430 |
| 2002/0018345 A1* | 2/2002 | Seifert | ...... | A63C 5/03 362/459 |
| 2004/0135347 A1* | 7/2004 | Marion | ...... | A63C 5/03 280/610 |
| 2005/0127639 A1* | 6/2005 | Sanders | ...... | A63C 5/12 280/610 |
| 2008/0029999 A1* | 2/2008 | Lee | ...... | A63C 5/052 280/609 |
| 2010/0019463 A1* | 1/2010 | Rancon | ...... | A63C 5/003 280/14.21 |
| 2013/0154237 A1* | 6/2013 | Karlsen | ...... | A63C 5/03 280/601 |
| 2016/0045812 A1* | 2/2016 | Tomer | ...... | A63C 5/003 280/816 |
| 2016/0114240 A1* | 4/2016 | Kim | ...... | A63C 5/12 280/609 |

* cited by examiner

*Primary Examiner* — Brian Swenson
(74) *Attorney, Agent, or Firm* — Schmeiser, Olsen & Watts, LLP (57) ABSTRACT

A snowboard having a unibody base layer constructed from a seamless and single continuous piece of material and methods for fabricating the snowboard with a unibody base layer having a central recess for nestling layers of the snowboard therein, a tip, tail and sidewalls as well as exterior grooves for attaching edges on the exterior of the unibody base layer. The resulting snowboard having increased resistance to water penetration, increased structural integrity and overall material strength, resistance to rotting of materials, decreased overall weight and improved flexibility.

15 Claims, 10 Drawing Sheets

UNIBODY SNOWBOARD

TECHNICAL FIELD

The present disclosure relates generally to equipment for board sports and more specifically to a snowboard apparatus and methods of fabricating the snowboard apparatus.

BACKGROUND

Modern snowboards are generally constructed from layers of material. Each layer of the material are coated with glue or epoxy and laying each layer of material over the last, in order to create a single laminate. The layers of material are encased in a mold or cassette and pressed together in a pneumatic press to be cured into a cohesive whole structure. This method for fabricating snowboards together may sometimes be referred to as a "sandwich" technique.

The sandwich technique is a time consuming method because it requires a plurality of pieces to be pressed together. The list includes approximately five pieces of plastic, two sheets of fiberglass, a wooden core, a steel edge and a top sheet. Between each of the layers in the sandwich method, is an amount of epoxy, which can become worn down over time. Often, the layers held together by the epoxy can become warped or develop imperfections over time resulting in the reduction of the board's structural integrity. Most commonly, the layers of a snowboard formed using sandwich techniques are vulnerable to water seeping into the board and rotting the wooden core, ruining the snowboard. Accordingly, there is a need for snowboards and method for fabricating snowboards that are water tight, less prone to the core rotting and have an increased structural integrity.

SUMMARY

A first embodiment of the present disclosure provides a snowboard comprised of a unibody base layer having a tip, a tail, a first sidewall having an outer groove, a second sidewall having a second outer groove, and a central recess; a first edge attached to the outer groove of the first sidewall, a second edge attached to the outer groove of the second sidewall and a core layer shaped to sit within the central recess, adjacent to an interior wall of the first sidewall and an interior wall of the second sidewall.

A second embodiment of the present disclosure provides a unibody base layer of a board sports device comprising a tip, a tail, a first sidewall, a second sidewall, and a central recess having a recess length formed by a distance between a first end and second end of the central recess, wherein the recess length is less than a length of the unibody base formed by a distance between the tip and tail.

A third embodiment of the present disclosure provides a method for constructing a board sports device comprising the steps of providing a base layer material, conforming the base layer material into a unibody base layer having a central recess, a first sidewall, a second sidewall, an outer groove, a second outer groove and a pair of locator pins; inserting a fiberglass layer, having a first bore and a second bore into the central recess; aligning the first bore and second bore with the pair of locator pins; attaching the first edge to the outer groove and the second edge to the second outer groove attaching the core layer to a top surface of the fiberglass layer; and aligning a first core layer bore and a second core layer bore with the pair of locator pins, wherein the pair of locator pins pass through the first bore, second bore, first core layer bore and second layer bore.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

The present disclosure enables a snowboard apparatus having a unibody base layer constructed from a single continuous piece of material and methods for fabricating the snowboard with a unibody base layer to seamlessly include a central recess, tip, tail and sidewalls. Embodiments of the unibody construction offer increased resistance to water penetration, increased structural integrity and overall material strength, resistance to rotting of materials used to construct the snowboard, decreased overall weight, and improved snowboard flexibility. Overall, the unibody construction may lead to an increased lifetime of the snowboard's use, and decreased incidents of the snowboard failure while being used by a user.

The present technology, methods and apparatuses described herein, may not only be limited to snowboards, but may be used and applied to any type of board based sporting device used for board sports. Examples may include but are not limited to sandboards, skis, snowskates/skiboards, water skis, wakeboards, skateboards and the like.

Figure 1:
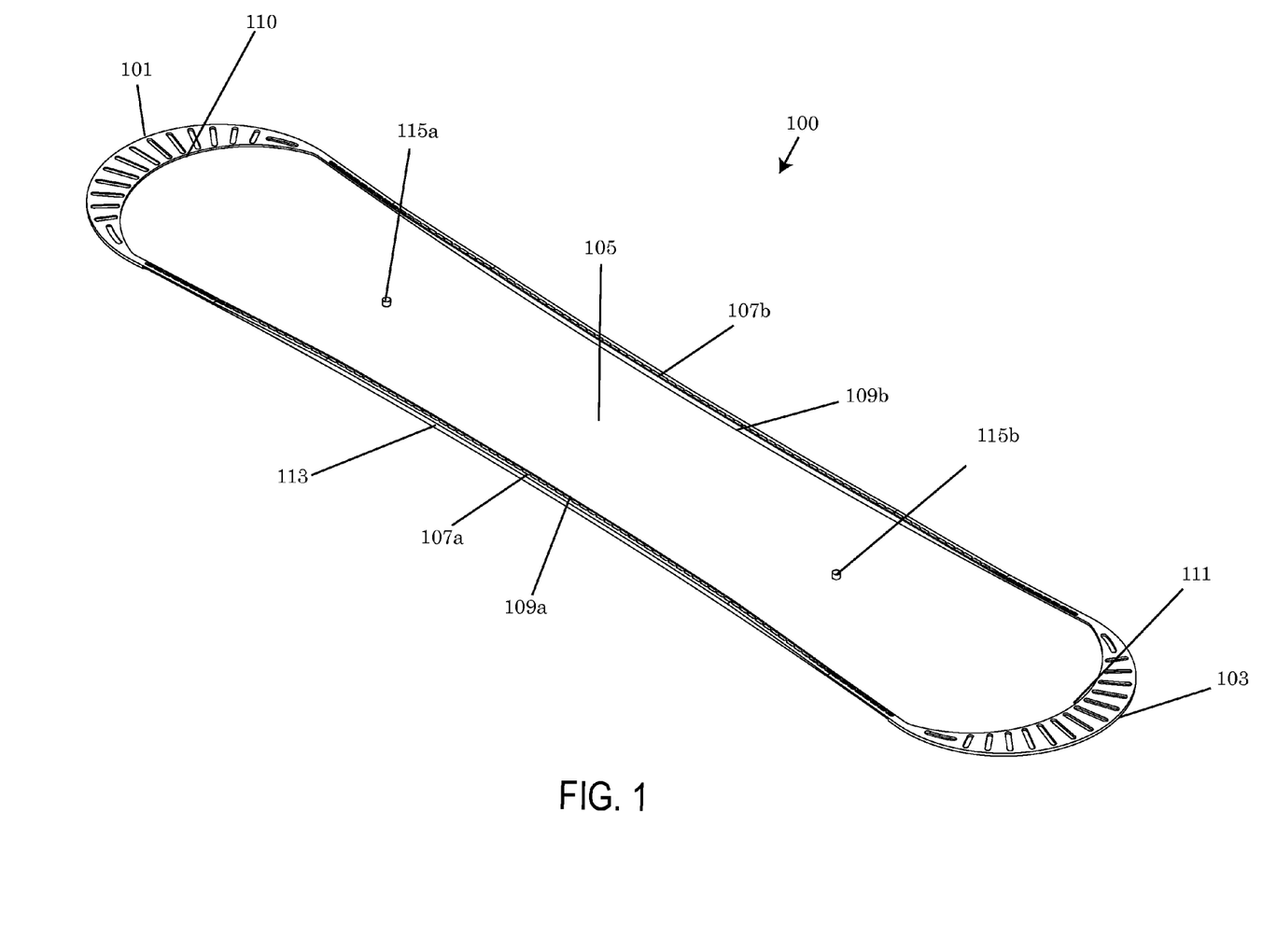
FIG. 1 depicts an isometric view of an embodiment of a unibody base layer of a snowboard.
Figure 2:
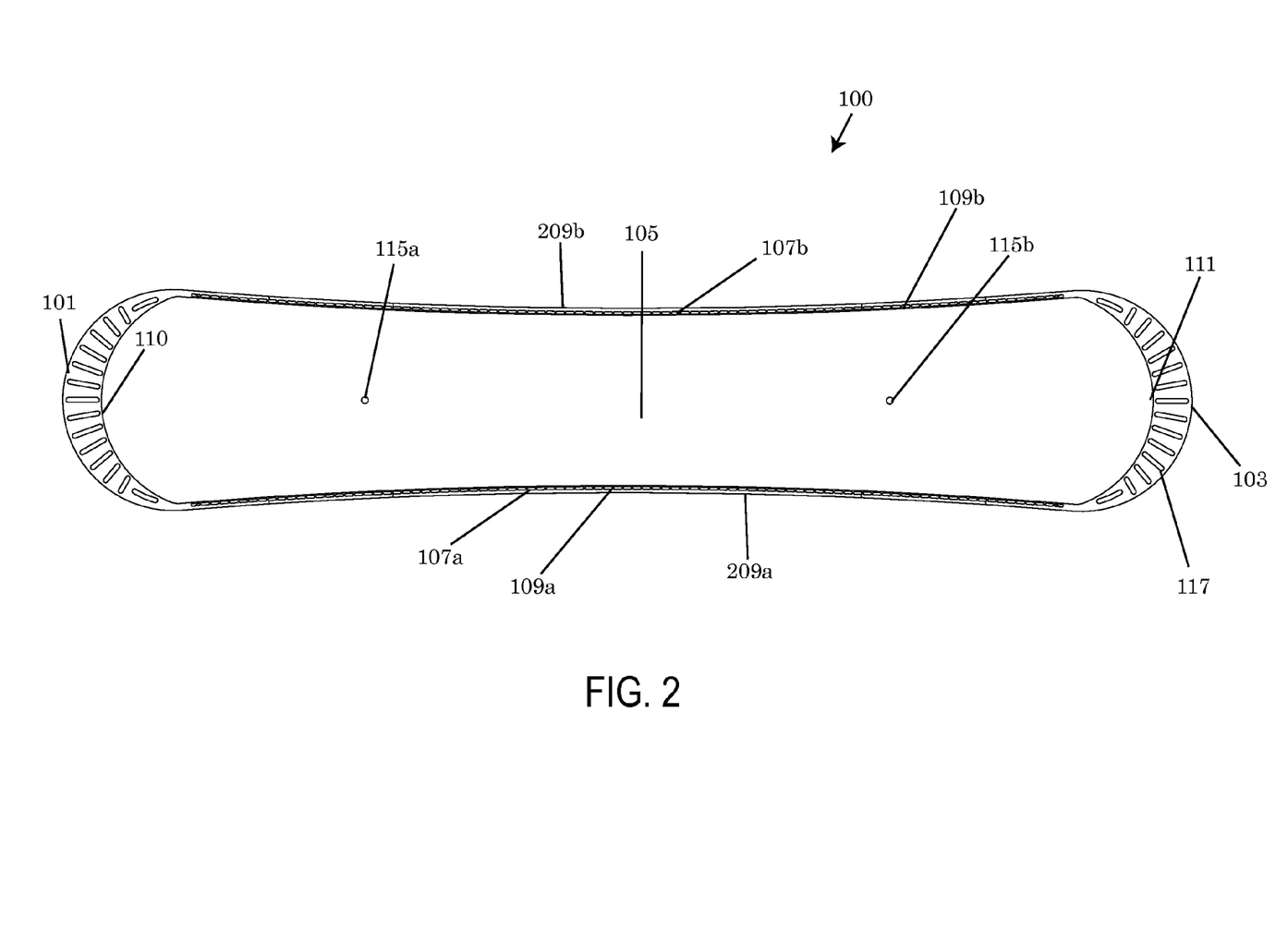
FIG. 2 depicts a top view of the unibody base layer embodiment of FIG. 1.
Figure 3:
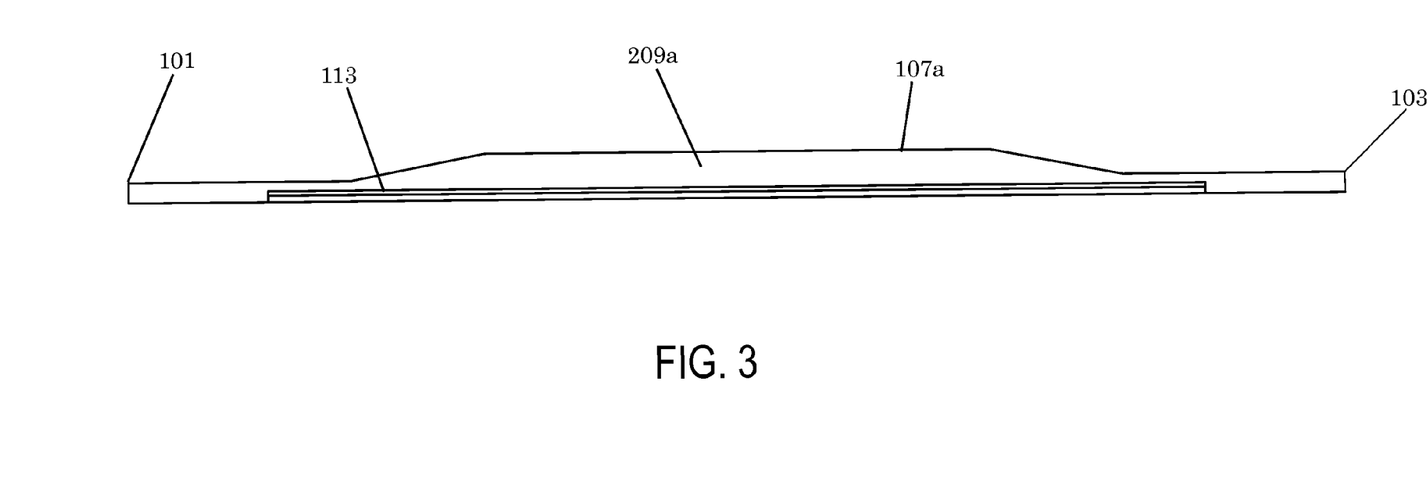
FIG. 3 depicts a side view of the unibody base layer embodiment of FIG. 1.

Referring to the drawings, FIG. 1 depicts an embodiment of a unibody base layer 100 which may be incorporated into a snowboard 10. Embodiments of the unibody base layer 100 may be constructed from a single and continuous piece of material. The unibody base layer may be constructed out of any rigid or semi-rigid material. The base material used for fabricating the unibody base layer 100 may include polyethylene, high-density polyethylene (HDPE), polycarbonate or ultra high molecular weight polyethylene (UHMW-PE) which may be referred to as P-Tex. In other embodiments, the unibody base layer 100 may also be constructed out of acrylonitrile butadiene styrene (ABS) plastic, nylon, polybutylene terephthalate (PBT), or wood. Embodiments of the base material used for forming the unibody base layer may be extruded through a die, sintered or sintered with a hybrid of graphite, gallium and/or indium.

The unibody base layer 100, may include a variety of seamlessly integrated features formed and shaped directly into the material of the unibody base layer 100 when it is constructed. These features that may be directly part of the unibody base layer may include the tail 101, the tip 103, a first sidewall 107a, a second sidewall 107b, an outer groove 113 which may be located on the underside of each of the side walls 107a, 107b, a central recess 105, plurality of locator pins 115a, 115b and a plurality of slots 117 along the perimeter of the unibody base layer 100.

The tail 101 may refer to the section of the unibody base layer 100 located at the rear end of unibody base layer 100 and the snowboard 10 generally. The location of the tail may differ depending on the stance of the user. For instance, a regular footed user who rides with the use's left foot forward would consider the edge of the board behind the user's right foot to be the snowboard's tail. Conversely, a goofy footed user who uses a snowboard 10 with the user's right foot forward may consider the edge of the snowboard behind the user's left foot to be the tail. Likewise, the tip 103 may refer to the front section of unibody base layer 100 and the snowboard 10, located at around the front edge, beyond the user's lead foot.

Embodiments of the unibody base layer may further include a plurality of slots 117, which may extend along the perimeter of the unibody base layer 100, including slots along the perimeter of the tail 101, tip 103, and the sidewalls 107a, 107b as depicted in the drawings. This plurality of slots 117 positioned along the perimeter of the board may serve dual functions. First, the slots 117 may allow for a manufacturer increase or decrease the flexibility of the unibody base layer 100. Adjustment to the flexibility may depend on the amount of slots made, the size, the spacing and the position of the slots 117. Secondarily, the slots 117 along the perimeter of the unibody base layer 100 may further be used as a guide when shaping the board, and removing sections of the base layer material when forming the central recess 105, locator pins 115a, 115b and outer grooves 113. The slots 117 may assist the manufacturer of the unibody base layer 100 by providing an area to catch, feed and maneuver the unibody base layer 100 in the various types of machinery that may be used for changing the shape of the tip 103, tail 111, and the sidewalls 107a, 107b.

Embodiments of the central recess 105 may refer to a depressed section of the unibody base layer 100, wherein the surface of the depressed area of the central recess sits at a depth lower than the top of the sidewalls 107a, 107b, tip 103 and tail 101. The perimeter of the central recess 105 may be formed by a boundary of the adjacent first interior side wall 109a, the second interior side wall 109b, the tail's interior wall 110 and the tip's interior wall 111. The depth of the central recess 105 may vary according to the specifications of the unibody base layer 100 and the specifications of snowboard 10 in general, including the materials used in the subsequent layers of the snowboard 10. The depth of the central recess 105 may also vary as the height of the sidewalls 107a, 107b and the thickness of the tip 103 and tail 101 may change from snowboard to snowboard to accommodate different thickness of the building materials and types of materials used for the remaining layers of the completed snowboard 10.

Embodiments of the unibody base layer 100 may further comprise one or more locator pins 115a, 115b within the central recess 105. Embodiments of the locator pins may assist the manufacturers of the snowboard 10 by acting as a guide for each of the layers being nestled into the central recess 105 of the unibody base layer 100. Each layer of the snowboard 10 may include one or more corresponding bores in the material of the layers above the unibody base layer that line up with the locator pins 115a, 115b. The upper layers may be placed onto the locator pins and slide down into the central recess 105, wherein the locator pins pass through the appropriate bores, maintaining the position of the stacked layers. The number of locator pins 115 may vary from embodiment to embodiment. While the exemplary embodiment depicts two locator pins 115a, 115b, the number of pins and their locations may vary according to the preferences of the manufacturer. As the number and location of the pins change in the unibody base layer 100, each subsequent layer of the snowboard 10 may alter the number and location of the bores to accommodate for the location and number of pins.

Some embodiments of the unibody base layer 100 may further include one or more outer grooves 113 formed in the underside of the exterior side walls 209a, 209b of both the first side wall 107a and the second sidewall 107b. Each outer groove 113 may form a channel under on the exterior surface of each sidewall. The channel formed by the outer grooves 113 provide a location for attaching the first edge 301a and second edge 301b to the unibody base layer 100 exterior to the central recess of the snowboard 10, without having to place the edges 301a, 301b in between layers 100 and 200 of snowboard 10. By placing the edges 301, 301b in the external groove, the layers 200, 400 and 500 of snowboard 10 may be nestled within the central recess 105 and bonded together, forming a water tight snowboard sealed from an external water source seeping in between the layers due to the seamless sidewalls 107a, 107b providing a barrier.

Attachment of the edges 301a, 301b may be performed in some embodiments by binding each edge within the groove 113 through the application of an adhesive, such as an epoxy resin which may harden once cured with a curing agent. Epoxy resins may include glycidyl epoxy resins and non-glycidyl epoxy resins. Glycidyl epoxy resins may include glycidyl-amines, glycidyl-esters or glycidyl ethers, while non-glycidyl epoxy resins may be aliphatic or cycloaliphatic resins, brominated resins, and epoxidized olefins. The term epoxy resin may further include resins that are created using bisphenol-A reacting with epichlorohydrin, novolac resins, polyester resins and polyvinyl resins.

The resins may be combined with a curing agent which chemically reacts to harden the resin to hold the edges 301a, 301b in place within the groove 113 or when using an epoxy resin used on the other layers 200, 400, 500, 600, 700 of the snowboard 10, then to bind these layers of the snowboard together. Examples of curing agents may include aliphatic amines such as triethylenetetramine (TETA), diethylenetriamine (DETA); aromatic amines including diaminodiphenyl sulfone (DDS) and dimethylaniline (DMA); anhydrides such as phthalic anhydride and nadic methyl anhydride (NMA); amine/phenol formaldehydes such as urea formaldehyde or melamine formaldehyde; tertiary amines and boron trifluoride complexes.

In addition to the resin and curing agent that form the epoxy resin, the epoxy resin may further include one or more diluents which may dilute or make the epoxy resin thinner. By thinning the epoxy resin, it may make it easier or more efficient to spread the epoxy resin on the appropriate layer 200, 400, 500 600, 700 or outer groove 113 to simplify the attachment of the layers or edges 301a, 301b. Examples of diluents may include glicidyl ethers such as n-butyl glycidyl ether (BGE), isopropyl glycidyl ether (IGE), phenyl glycidyl ether (PGE); organic solvents such as toluene, xylene, acetone, methyl ethyl ketone (MEK), 1,1,1-trichloroethane (TCA); and glycol ethers.

In some embodiments, the epoxy resins may further include one or more fillers. These fillers may be used for the purpose of adding bulk to the epoxy resin. Examples of fillers that may be added to the epoxy resin may include but are not limited to powders or fibers such as sand, clay, calcium carbonate, fiberglass, asbestos, or silica.

In a standard snowboard, the edges are typically attached in between a base layer and second layer of a standard snowboard, instead of being attached to the exterior of a base layer. The placement of the outer grooves 113 on the underside of the exterior side walls 209a, 209b improves the ability of the completed snowboard 10 to prevent the intrusion of water into the interior of the snowboard 10 or central recess 105 resulting in a significant reduction in the deterioration and separation of the materials used to complete the snowboard 10. In the exemplary embodiment shown in FIG. 4, the edges 301a, 301b are not positioned between the unibody base layer 100 and fiberglass layer 200. Instead the edges 301a, 301b reside within the external groove 113 located outside of the unibody base layer 100 instead of being layered on top of the sidewalls 107a, 107b.

Figure 4:
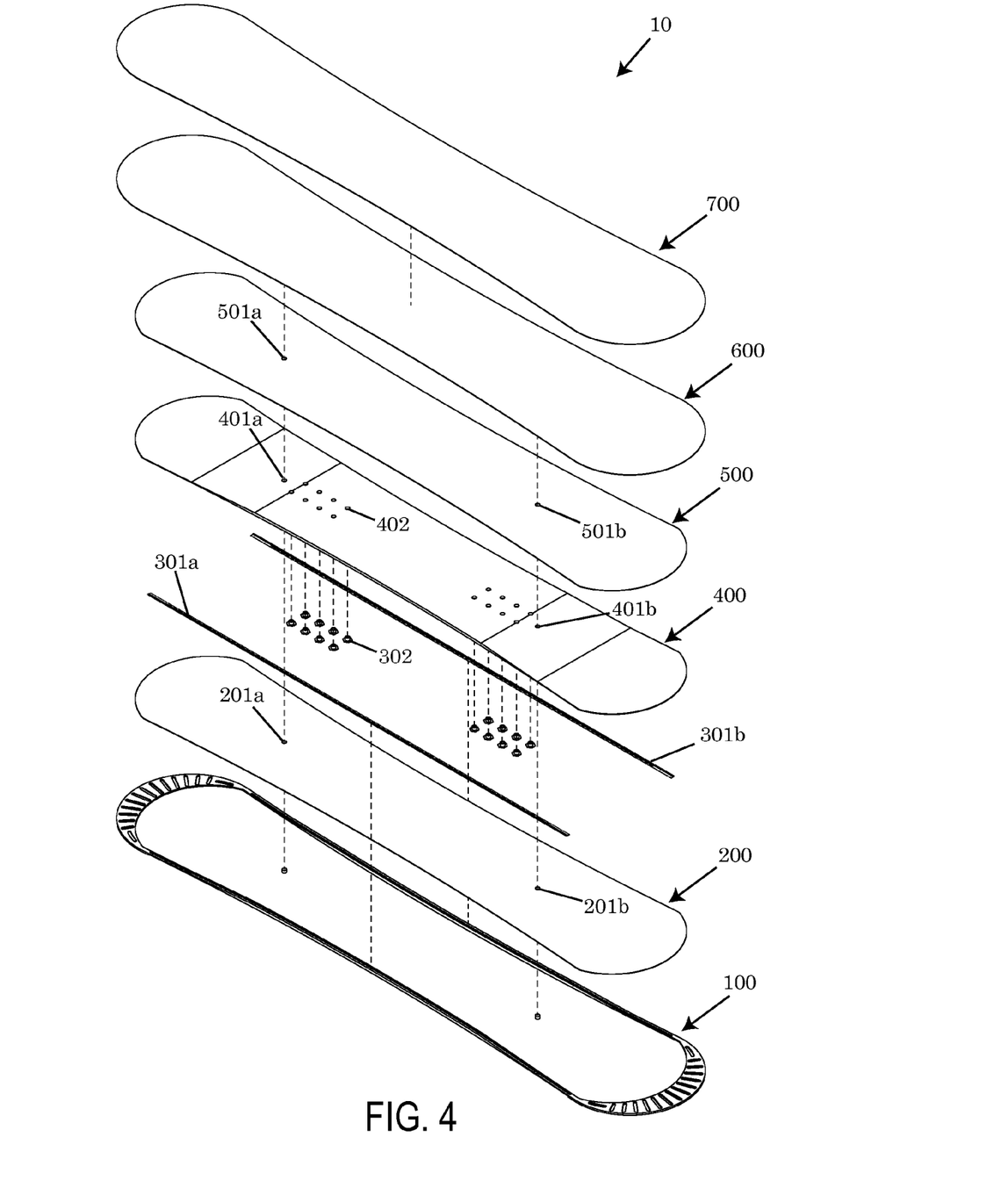
FIG. 4 depicts an exploded view of an embodiment of a snowboard having a unibody base layer.
Figure 5:
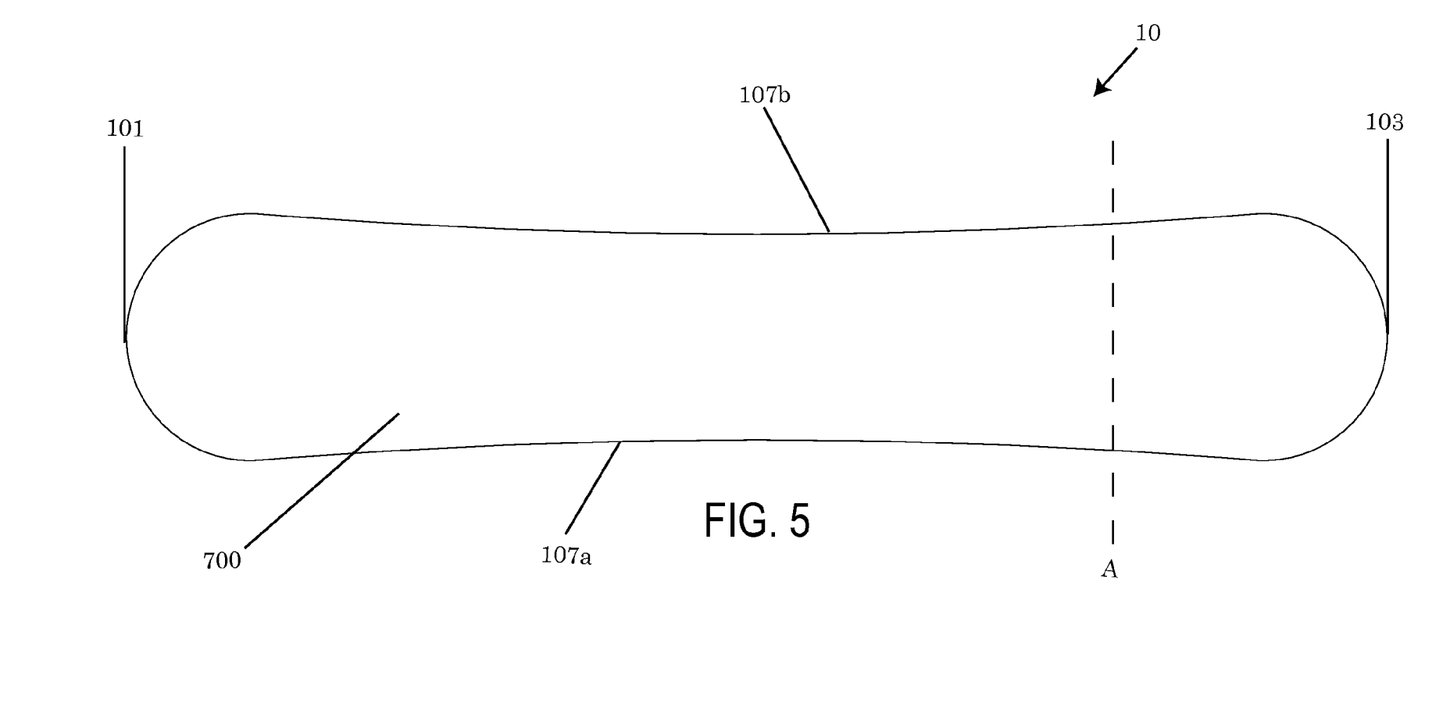
FIG. 5 depicts a top view of an embodiment of a snowboard having a unibody base layer.
Figure 6:
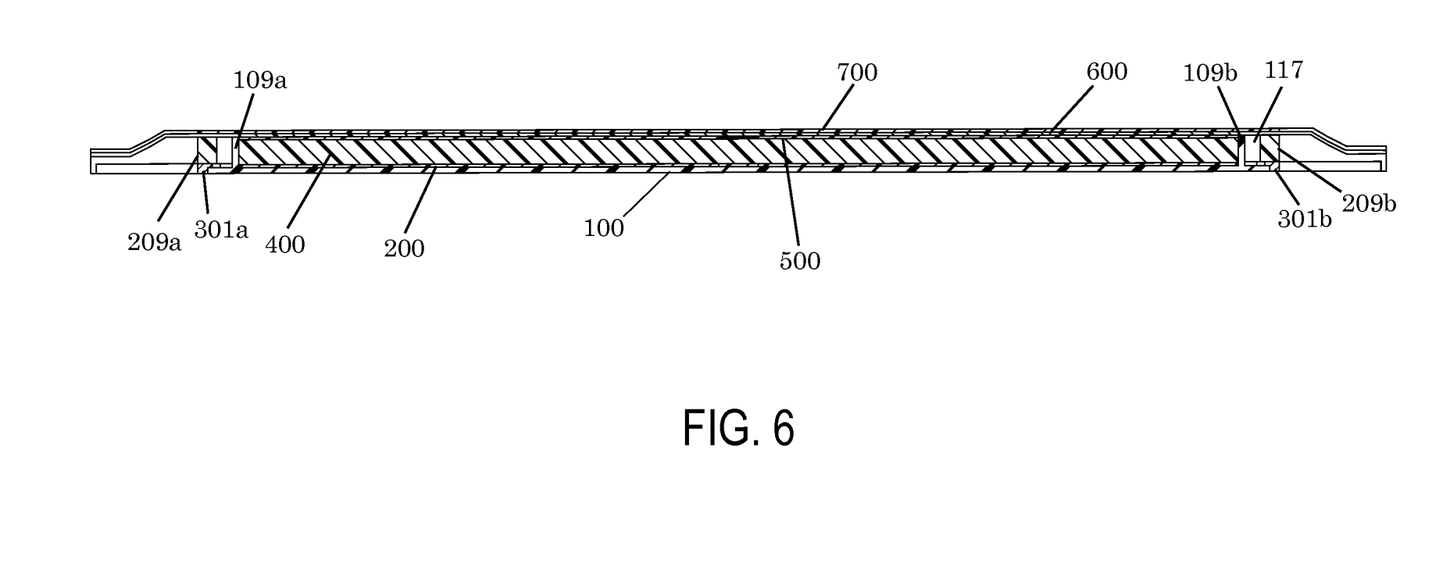
FIG. 6 depicts a front cross sectional view of the embodiment of the snowboard of FIG. 5, cut along axis A.

The attachment of edges 301a, 301b, is independent of the remaining layers 200, 400, 500, 600 700 of snowboard 10. Edge 301a, 301b may be attached directly into each of the grooves 113 and may run along the entire length of the groove 113 which may extend along the underside of the entire sidewall 107a, 107b. If water enters in between the groove 113 and either edge 301a, 301b, there will not be a risk of damage to the remaining layers of the snowboard 10, because the remaining layers are inaccessible to the water from the external groove 113 that runs along the exterior of the sidewall 109a, 109b.

The unibody base layer 100, and its numerous features, including the tip 103, tail 101, slots 117, locator pins 115a, 115b, sidewalls 107a, 107b, central recess 105 and external groove 113 may formed out of a single piece of unibody base layer 100 material described above. The material forming the unibody base layer may be cut, trimmed, milled or formed to shape in some embodiments. For example, in some embodiments, the base material can be formed to include each feature by milling, CNC routing, injection molding, die cutting, laser cutting or using a combination of manufacturing techniques to transform the base material into the unibody base layer 100 having each of the features described herein. In the Exemplary embodiment, the unibody base layer 100 may have the central recess 105 formed by milling the central area using a CNC machine to carve out the depression of the central recess 105 and the grooves 113 of the exterior side wall 209a, 209b. By carving out the base material, the sidewalls 107a, 107b, tip 103, and tail will be subsequently formed. In another exemplary embodiment, the central recess 105 may be formed using injection molding techniques, wherein the forms used in the injection molding techniques create a void of material where the central recess 105 is located.

The size of the unibody base layer 100, the central recess 105 and the ratios thereof may vary based on the overall size of the unibody base layer and the size of the final snowboard 10. In some embodiments, the length of the unibody base layer 100 measured from the edge of the tip 103 to the edge of the tail 101, may be 56 inches (~142 cm) or less, up to 65 inches (~165 cm) or more in length. For instance, embodiments of the snowboard 10 may have an overall length of 58 inches (~147 cm), 60 inches (~152 cm), 61 inches (~155 cm), 63 inches (~160 cm) or 64 inches (162 cm). The central recess 105, which may not extend the entire length of the unibody base layer, but rather extend to a length less than the length of the snowboard 10, may have a recess length measured from the interior wall of the tail 110 and the interior wall of the tip 111. Embodiments of the recess length may be between approximately 50 inches (127 cm) up to approximately 60 inches (~153 cm). The ratios between the unibody base layer length and the recess length may be approximately 1.10:1.00 to 1.30:1.00. For example, a 58 in. board may have a unibody base length of 58 in. and a recess length of 53.84 in., whereas 60, 61, 63 and 64 in. snowboard having a unibody length of 60 in., 61, 63 and 64 in. may each have a recess length of 55.84, 56.84, 58.84 and 59.84 in. respectively.

Referring back to the drawings, FIG. 4 depicts an embodiment of a snowboard 10 constructed using the unibody base layer 100 described above. The snowboard 10 may include a first fiberglass layer 200, a core layer 400, a second fiberglass layer 500, a graphics layer 600 and a top layer 700. Although FIG. 4 depicts each layer and the layers in a particular order, it is not necessary for every layer to be present or in the order shown in the drawings. The presence or absence of one or more layers and the order which the layers are bound to one another may be determined by the purpose and specifications of the snowboard 10 being constructed.

Embodiments of snowboard 10 may be constructed by nestling one or more layers of the snowboard 10 within the central recess 105. Each of the nestled layers may be protected from exposure to water and moisture in some embodiments due to the natural shape and rise of the sidewalls 107a, 107b which surround the central recess 105 acting as a barrier to prevent water from entering. In the exemplary embodiments depicted of the current disclosure, the first fiberglass layer 200, core layer 400 and the second fiberglass layer 500 may be nestled within the central recess 105 of the unibody base layer 100. In some embodiments, even once layered on top of one another, the first fiberglass layer 200, core layer 400 and second fiberglass layer may be constructed of a thickness that does not exceed the thickness of the central recess 105 and/or the height of the sidewalls 107a, 107b of the unibody base layer 100.

The first fiberglass layer 200 may be the first layer of the snowboard 10 to be placed within the central recess 105 of the unibody base layer 100. The first fiberglass layer 200 may be cut to any shape or size. In the exemplary embodiment, the first fiberglass layer 200 is cut to the shape and size of the central recess 105 and can be fitted to nestle within the central recess 105 between the first interior sidewall 109a, second interior sidewall 109b, the interior wall of the tip 111 and the interior wall of the tail 110.

The first fiberglass layer 200 may help to increase the stiffness of the snowboard 10 and prevent the snowboard 10 from deforming. The first fiberglass layer 200 may be structured in some embodiments as a bi-axial wrap or a tri-axial wrap. The bi-axial wrap is a formation of the fiberglass layer wherein glass fiber strands are weaved together at 90° angles to each other to produce a lightweight layer of fiberglass. A tri-axial wrapping technique is where the glass fiber strands are weaved at 45°, 0° and −45° to each other. The tri-axial wrapping technique will still produce a lightweight fiberglass layer, but a layer of fiberglass having the tri-axial wrap may have increased torsional stiffness compared with a bi-axially wrapped fiberglass layer.

In some embodiments, the first fiberglass layer 200 may include a first bore 201a and a second bore 201b. Each bore 201a, 201b may be sized and positioned to receive the locator pins 115a, 115b accordingly. The bores 201a, 201b may guide the first fiberglass layer 200 into the proper position within the central recess 105 by aligning the first bore 201a over the first locator pin 115a and aligning the second bore 201b over the second locator pin 115b and sliding the first fiberglass layer downward into the central recess. In one or more embodiments, the central recess 105 and/or the bottom surface of the fiberglass layer 200 may be coated with an epoxy resin, similar to the epoxy resins described above for binding the edges 301a, 301b to the groove 113. Once hardened, the epoxy resin spread over the central recess 105 and the bottom surface of the fiberglass may permanently hold the first fiberglass layer in place within the central recess 105.

The next layer that may be nestled within the central recess 105 of the unibody base layer 100 may be the core layer 400. Embodiments of the core layer 400 may be constructed from foam, wood, carbon, Kevlar, aluminum, steel, other metal alloys or a combination of materials thereof. In some embodiments where an aluminum core is used, the core layer may be formed into a honeycomb shape. The voids of the honeycomb shape may be left hollow, filled with an additional core material or filled with the epoxy resin. The selection of core layer 400 materials may be dependent on the strength, flexibility and weight of the snowboard 10 desired. In the exemplary embodiment, the core may be constructed out of wood, however in other embodiments, the core layer 400 may be composite core made from both aluminum and wood which may provide a stronger core having a greater amount of flexibility than a wood core alone.

Figure 7:
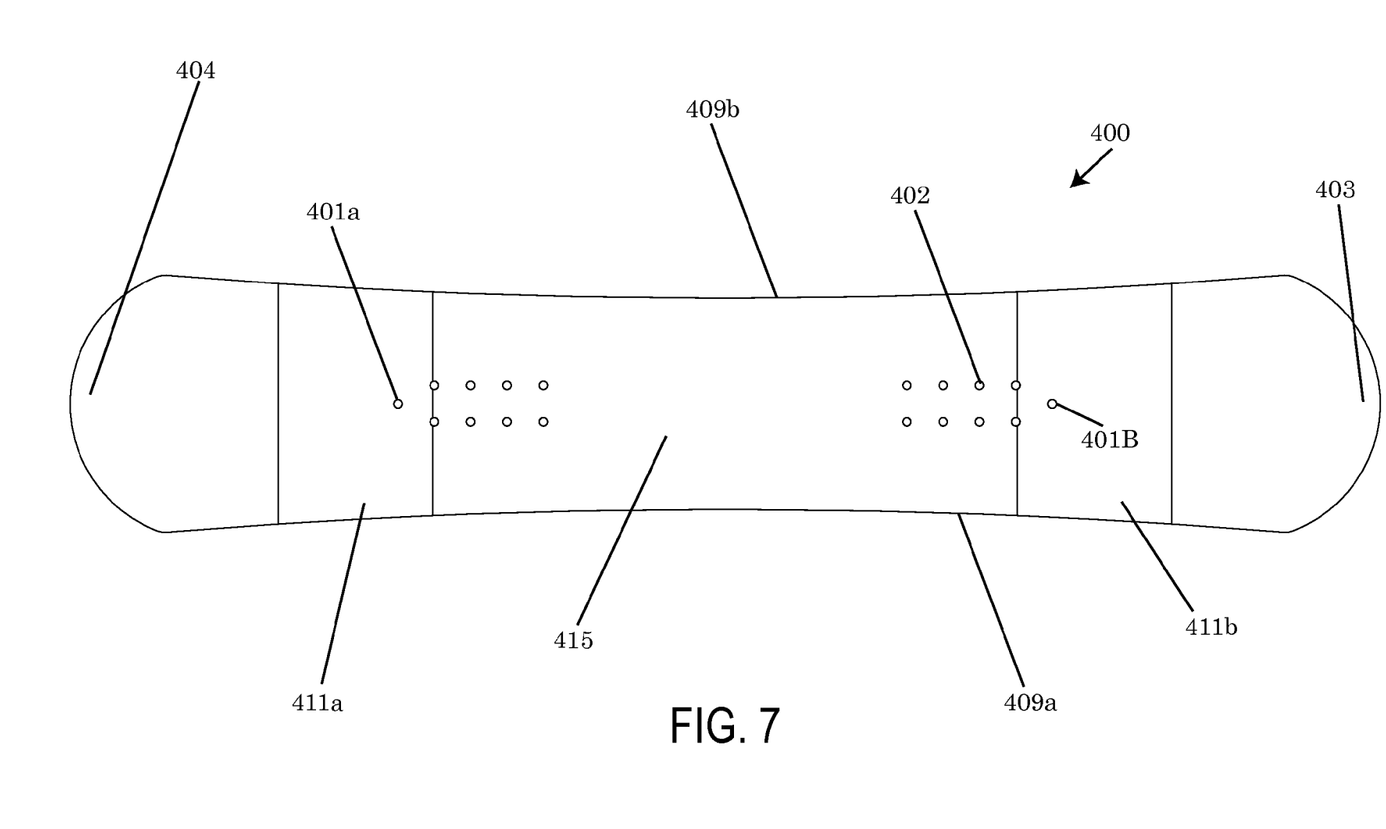
FIG. 7 depicts a top view of an embodiment of a core layer of a snowboard.
Figure 8:
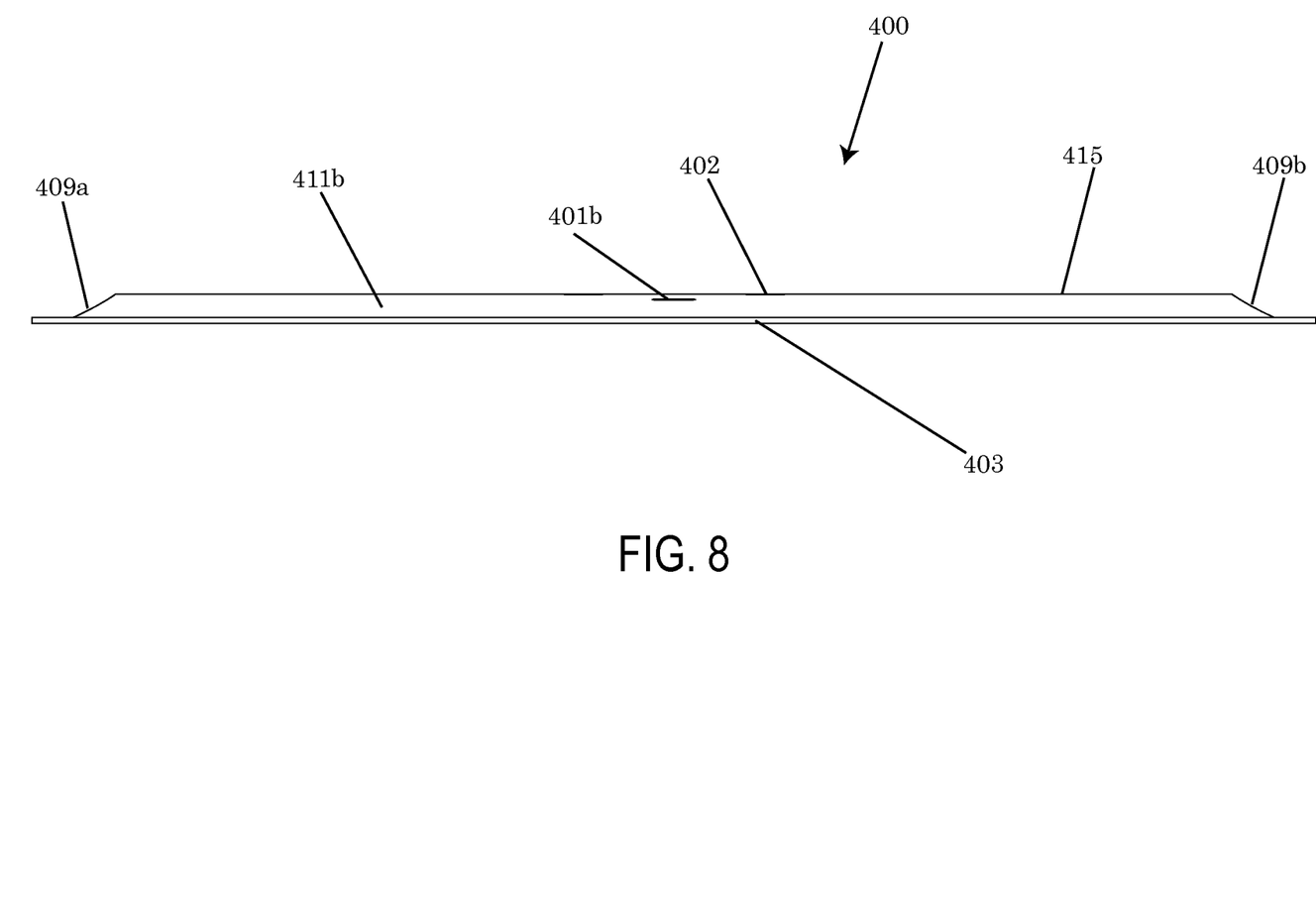
FIG. 8 depicts a front view of the embodiment of the core layer depicted in FIG. 7.
Figure 9:
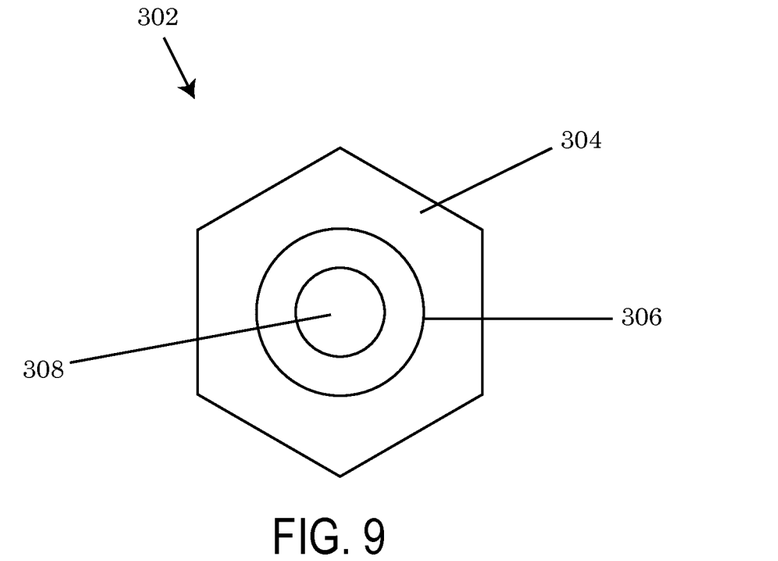
FIG. 9 depicts a top view of an embodiment of a threaded insert.
Figure 10:
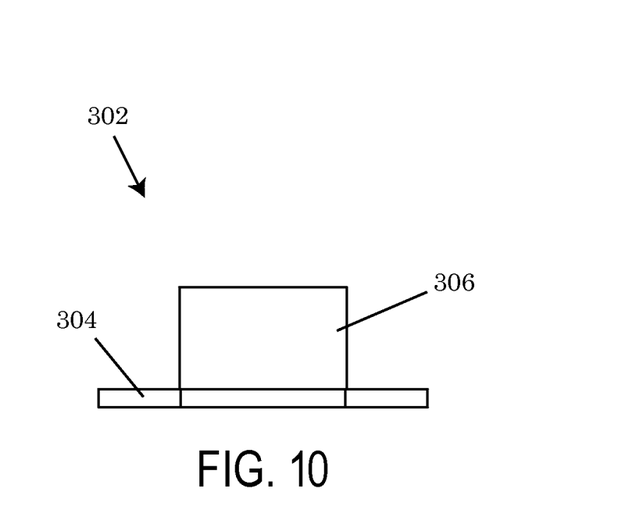
FIG. 10 depicts a side view of the threaded insert embodiment of FIG. 9.

The shape of the core layer may vary depending on the desired shape and use of the snowboard 10. The profile of the Snowboard 10 may have any known shape, and the core layer 400 may be shaped appropriately. Examples of snowboard shapes that may be made may include snowboards having varying degrees of a camber profile, a rocker profile or a flat profile. As shown in FIG. 7, the core layer 400 may have a core tail 404, a first transition 411a, a central section 415, a second transition 411b and a core tip 403. The shape of the core layer 400 will depend on the type of snowboard profile being used. For example, in the exemplary embodiment, the snowboard profile is a camber profile. Accordingly, in the camber profile, the extension of the first transition 411a toward the central section 415 may elevate upwards at an angle less than 90°, but greater than 0°. Subsequently, at interface between the central section 415 and the first transition 411a, the central section 415 may proceed to flatten out. Furthermore, at the interface between the central section 415 and the second core transition 411b, the second core transition 411b may decline in elevation at an angle greater than −90° and less than 0° until the interface between the second core transition 411b and the tip 403 is reached.

In an embodiment of the core layer 400, wherein the snowboard side profile is a rocker shape, the side profile may be inverted from the camber shape described above. For example, looking at FIG. 7, and moving from left to right, the first core transition 411a, may decline in elevation at an angle between −90° and 0° until the interface between the first core transition 411a and the central section 415 is reached. The central section 415 may be flat or substantially flat in shape until the second transition 411b increases in elevation on an incline at an angle between 0° and 90° until the interface of the second transition 411b and the core tip 403.

Furthermore, in some embodiments, the side profile of the core layer 400 may be flat. A flat core layer 400 having a flat profile may have still have a rocker shape to the core tail 404 and core tip, however the first core transition 411a, central section 415 and second transition 411b may be flat in shape or substantially flat in shape.

In some embodiments, the core layer may further include a first core bore 401a, a second core bore 401b and a plurality of binding bores 402. The first and second core bores 401a, 401b may be sized and positioned in a manner similar to the first and second bore 201a, 201b of the fiberglass layer 200. Similar to the first and second bores 201a, 201b of the fiberglass layer, the first 401a and second 401b core bores may be sized, positioned and aligned to receive the first locator pin 115a and second locator pin 115b, allowing each to pass through the first core bore 401a and second core bore 401b respectively. Accordingly, in some embodiments, the top surface of the first fiberglass layer 200, and/or the bottom surface of the core layer 400 may be coated with an epoxy resin. Subsequently, the first core bore 401a may be aligned with the first locator pin 115a, and the second core bore 401b may be aligned with the second locator pin 115b. Each locator pin 115a, 115b may extend through the respective bores 401a, 401b allowing for the bottom surface of the core layer 400 to be seated flush on the top surface of the first fiberglass layer 200, allowing the core layer 400 to sit within the central recess adjacent to the interior walls 109a, 109b of the unibody base layer 100, within the central recess 105.

Embodiments of the core layer 400 aligned into place with the locator pins 115a, 115b passing through the respective core bores 401a, 401b, may be nestled within the central recess 105a once placed into position and seated on the first fiberglass layer 200. In some embodiments, the front edge of the core tip 403 and the rear edge of the core tail 401 may be placed immediately adjacent to the interior wall of the tip 111 and the interior wall of the tail 110 respectively of the unibody base layer 100. Furthermore, in some embodiments, the first core sidewall 409a may be aligned immediately adjacent to the first interior sidewall 109a for the entire length of the sidewall 107a. The second core sidewall 409b, once placed within the central recess 105, may be positioned to be immediately adjacent to the second interior sidewall 109b of the second sidewall 107b. The contours of the core side walls 409a, 409b may be shaped to mirror the contours of the each interior side wall 109a, 109b respectively, for the entire length of the sidewalls 107a, 107b which the core side walls 409a, 409b are adjacent to.

In an alternative embodiment, the core layer may be shaped in such a manner that the core tip 403 and the core tail may rise above the depression of the central recess 105, allowing for the core tip 403 and core tail 401 to extend or overlap the tip 103 and tail 101 respectively. In such an embodiment, the epoxy resin may be spread over tip 103, tail 101, the bottom surface of the core tip 403 and/or the bottom surface of the core tail 401 in order to bind the core tip 403 to the tip 103 of the base layer as well as bind the bottom surface of the core tail 401 to the top surface of the tail 101 of the base layer 100.

Figure 11:
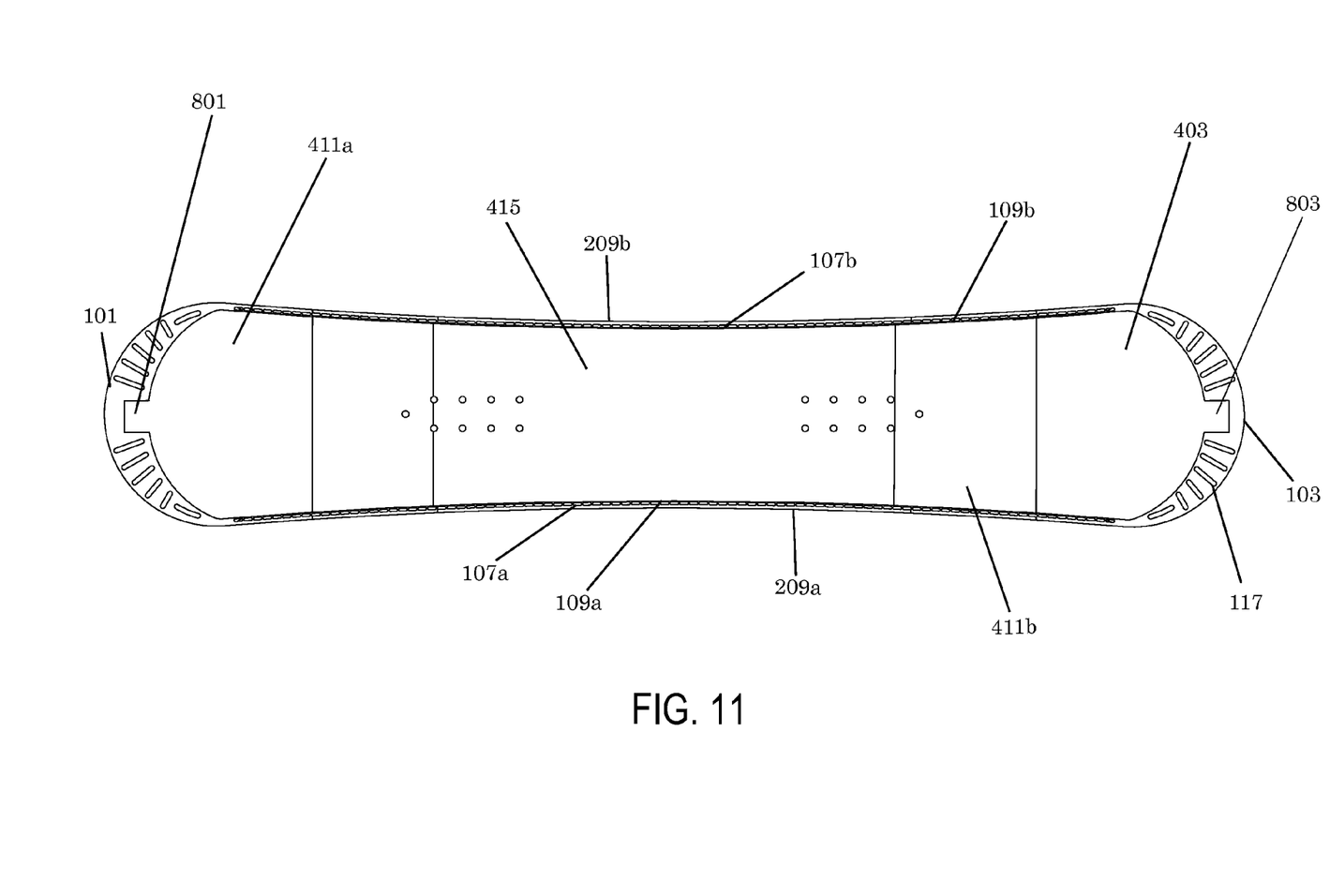
FIG. 11 depicts a top view of an alternative embodiment of a core layer affixed to an embodiment of a unibody base layer.

In another alternative embodiment of the core layer depicted in FIG. 11, the core layer may partially extend into the tip 103 and/or tail 101. As shown by the alternative core layer embodiment of FIG. 11 nestled in the unibody base layer 100, the alternative core layer may include a tail extension 801 and/or a tip extension 803 which may be seated and/or bound onto the top surface of the tail 101 and tip 103 respectively.

Embodiments of the core layer 400 may further comprise a plurality of binding bores 402. The plurality of binding bores may be extend through the core layer 400 as shown in FIG. 7 for the purpose of providing a secure area for attaching snowboard bindings (not pictured) to the snowboard 10. The number of binding bores 402 may vary from core layer to core layer, however, in some embodiments; the plurality of bores may be between 8 and 20 bores spaced in two even sections of the core layer. For example in the exemplary embodiment of the core layer 400, the plurality of binding bores 402 are present in two distinct sections of the central section 415. The first plurality of bores being positioned to the left of the center of the central section 415, comprising eight bores positioned in two rows of four. On the opposite side of the exemplary embodiment, to the right of the center of the central section 415, a second set of eight binding bores 402 are present in two rows of four. Although each set of binding bores positioned to the right and left side of the central section 415 are placed in two distinct rows of four, such a pattern and position of the bores may vary according to the attachment patterns of snowboard binding that the manufacturers use. For instance, the pattern of the binding bores 402 may be placed in vertical lines, a square or rectangle pattern, star shape, or any other pattern possible for attaching bindings to the core layer 400.

As shown in the embodiment of the core layer 400 in FIG. 4, one or more threaded inserts 302 may be inserted into the binding bores 403. As shown in the exemplary embodiment, the threaded insert 302 may enter into the binding bore 402 from the underside of the core layer 400 and into the hole of each binding bore. Embodiments of the threaded insert 302 may include a neck 306, a base 304 and a central bore 308. In some embodiments, the neck 306 of the threaded insert may be sized to fit into the binding bore 402 and extend through the binding bore 402.

Embodiments of the base 304 of the threaded insert 302 may be sized larger than the binding bore 402, wherein upon the insertion of the threaded insert 302 into the binding bore 402, the base 304 may make contact with the bottom surface of the core layer 400. In some embodiments, the base 304 of the threaded insert 302 may sit flush with the bottom surface of the core layer, once the neck 306 of the threaded insert 302 is fully extended through the binding bore 402. When the core layer 400 is bonded using an epoxy resin to the first fiberglass layer 200 below, threaded inserts 302 may also be securely attached and bonded to prevent removal of the threaded insert from the binding bore 402. The central bore 308 of the threaded insert 302, once inserted into the binding bore 402, may be able to receive one or more fasteners such as screws, pins, rivets or other fasteners. The fasteners may be cable of drilling through the layers of snowboard 10 and enter the central bore 308 of the threaded insert 302 where they may be securely tightened in a manner that affixes a snowboard binding to the snowboard 10.

Embodiments of the snowboard 10, may further comprise a second layer of fiberglass 500 which may be placed over the core layer 400. The second fiberglass 500 may be identical to the first fiberglass layer 200 that may reside in the layer of snowboard 10 that is beneath the core layer. Similar to the first fiberglass layer 200, the second fiberglass layer 400 may be bonded to the core layer 400 by spreading epoxy over the top surface of the core layer 400 and/or the bottom surface of the second fiberglass layer 400. Additionally, in some embodiments, the second fiberglass layer may further include a pair of bores 501*a*, 501*b* which are capable of receiving locator pins 115*a*, 115*b*. The locator pins 115*a*, 115*b* may assist the manufacturing to properly align bores 501*a*, 501*b* of the second fiberglass layer 500 with the previous layers beneath the second fiberglass layer 500. Once aligned over the locator pins 115*a*, 115*b*, the pins 115*a*, 115*b*, may pass through the bores 501*a*, 501*b* of the second fiberglass layer and the epoxy on the top surface of the core layer 400 and/or bottom surface of the second fiberglass layer 500 may be pressed together and allowed to harden the two surfaces together.

In some embodiments, the size and position of the second fiberglass layer 500 may allow for the second fiberglass layer to fit snuggly into the central recess 105 of the unibody base layer 100. The second fiberglass layer 500 may be positioned immediately adjacent to the interior sidewalls 109*a*, 109*b*, interior wall of the tail 110 and interior wall of the tip 111. In certain embodiments, the thickness of the layers below the second fiberglass layer 500 may be a sufficient thickness, such that the top surface of the second fiberglass layer 500 is made flush along the contours of the snowboard 10, including being made flush with the top surface of sidewalls 107*a*, 107*b*, the tail 101 and the tip 103 of the unibody base layer 100. In alternative embodiments where the top surface of the core layer extends from the tip 103 to the tail 101 of the unibody base layer 100, the second fiberglass layer 500 may also extend the entire length of the snowboard 10, by being sized to extend from the core tip 403 to the core tail 404.

Embodiments of snowboard 10 may further comprise a graphics layer 600 and a top layer 700. In some embodiments, the graphics layer 600 and the top layer 700 may be part of the same layer. In other embodiments, the graphics layer 600 and top layer 700 may be distinct and separate layers. The materials used for the top layer 700 and the graphic's layer 600 may be dependent on the technique used to print the graphics onto the snowboard 10. Methods that may be used may include encapsulation or sublimation. Using the encapsulation method, the graphics may be printed onto the graphics layer 600 which may be a piece of paper, cloth, canvas or other material. The printed graphics may be placed under the clear top layer 700 or clear lacquer of the top layer 700 in order to expose the graphics underneath.

The top layer 700 having the graphics 600 encapsulated therein may then be bound using an epoxy resin described above, to the bind the graphics layer 600 and top layer 700 to the second fiberglass layer 500, the top layer of the tip 101, tail 103 and sidewalls 107*a*, 107*b*. The top layer 700 and the graphics layer 600 may be cut and shaped to an appropriate size such that the top layer 700 and graphics layer 600 extend to the length and width of the unibody base layer 100, contouring to the shape of the unibody base layer 100. In some embodiments, epoxy resin may be spread along the top surface second fiberglass layer 500, the top surface of the tail 103, tip, 101 and sidewalls 107*a*, 107*b* of the unibody base layer and/or the bottom surface of the top layer 700 encapsulating the graphics layer 600. The epoxy being spread over the top surface of the unibody base layer 100 may fill in the plurality of slots 117 located around the perimeter of the unibody base. Once hardened, the top layer 700 and the graphics 600 may perfectly cover the top surfaces of the unibody base layer 100 from tip 103 to tail 101 and all of the layers nestled in the central recess 105 of the unibody base layer.

In an alternative embodiment, the graphics layer 600 may be fused into the materials of top layer 700 via sublimation using suitable inks, plastics and heat. The inks used may be inserted in the graphic layer 600 may bleed into the porous areas of the top layer 700, bleeding all the way through the material of the top layer 700 in such a manner that even if the lop layer 700 becomes scratched or dinged, the graphics layer 600 underneath the scratch or ding remains visible and unblemished. The materials used for the top layer 700 may be any material previously described as being used for the unibody base layer 100, including nylon, polyethylene, high-density polyethylene (HDPE), polycarbonate, UHMW-PE (P-Tex), ABS plastic, PBT or even wood. The top layer 700 that has been prepared using the sublimation technique to apply the graphics layer 600 may be attached second fiberglass layer 200 and/or the exposed top surfaces of the unibody base layer in the same manner using an epoxy, as described above for when using the encapsulation technique, completing the construction of the snowboard 10, once hardened.

Embodiments of methods for constructing snowboard 10 may include a step of providing a base layer material and then conforming the base layer material into a unibody base layer 100 having a central recess 105, first sidewall 107*a*, second sidewall 107*b* a first and second outer groove 113, slots 117 and a pair of locator pins 115*a*, 115*b*. The step of conforming the base layer material into the unibody base layer 100, may be performed by milling or routing each of the above unibody base layer 100 elements with a CNC machine, injection molding each of the features using one or more forms, or cutting the base layer material using a die or laser cutter and/or a combination of techniques thereof.

In some embodiments, the method for constructing the snowboard 10, may further comprise a step of inserting a first fiberglass layer 200, having a first bore 201*a* and a second bore 201*b* into the central recess 105 of the unibody base layer. This step may further comprise aligning the first bore 201*a* and second bore 201*b* with the pair of locator pins 115*a*, 115*b* and extending the locator pins 115*a*, 115*b* through each respective bore. The fiberglass layer 200 may be slid into place within the central recess and permanently affixed to the central recess 105 by applying an epoxy resin to the fiberglass layer or central recess before sliding the fiberglass into place and then curing the epoxy resin, allowing it to harden once the fiberglass layer has been nestled within the central recess 105.

Embodiments of the method for constructing the snowboard 10, may include one or more steps for attaching the edges 301*a*, 301*b* to the outer groove 113 of the unibody base layer 100. In some embodiments, the first edge 301*a* may be attached within the channel formed by the outer groove 113 extending along the exterior wall 209*a* of the first side wall 107*a*, while the second edge 301*b* may be affixed within the channel formed by the second outer groove of the exterior sidewall 209*b*, located on the opposite side of the exterior sidewall 209*a*. The step of attaching each of the edges 301*a*, 301*b* may be performed using an adhesive such as the epoxy resins described above, and allowing the resin to cure until hardened.

In one or more additional steps, embodiments of the method may further include a step for attaching the core layer 400 to the top surface of the fiberglass layer 200. This attaching step may include a step of preparing the core layer 400, by inserting a threaded inserts 302 into the each of the plurality of binding bores 402. Subsequently, after preparing the core layer with the threaded inserts, an epoxy resin or other adhesive, may be spread along the top surface of the fiberglass layer 200 and/or the bottom surface of the core layer 400, followed by aligning the first core layer bore 401*a*, and the second core layer bore 401*b* with the locator pins 115*a*, 115*b* respectively. Once the locator pins 115*a*, 115*b* are properly aligned, the locator pins may pass through the core layer bores 401*a*, 401*b* as well as the first bore 201*a* and second bore 201*b* of the fiberglass layer 200, allowing the core layer 400 to nestle within the central recess 105 while being seated on top of the first fiberglass layer 200.

In some embodiments of the method for preparing a snowboard 10, the method may include a step of binding a second fiberglass layer to the top surface of the core layer 400. The second fiberglass layer may include one or more bores 501*a*, 501*b* that may be positioned to receive the locator pins 115*a*, 115*b* which may already be extending through the bores of the first fiberglass layer and the core layer. The method may include a step of aligning the second fiberglass bores 501*a*, 501*b* with the locator pins and applying a force sufficient to slide the locator pins through the bores of the second fiberglass layer. This binding step may be made a permanent affixation by applying an adhesive or epoxy resin to the top surface of the core layer 400 and/or the bottom surface of the second fiberglass layer 500. In some embodiments, the step of binding the second fiberglass layer 500 may include the step of positioning the second fiberglass layer to make a flush transition between the second fiberglass layer 500 and the top surface of the snowboard's sidewalls 107*a*, 107*b*, tip 103 and/or tail 101.

In one or more embodiments of the method for preparing a snowboard 10, a step of applying the graphics to the snowboard may be performed. This step may comprise encapsulating a graphic layer 600 within a top layer 700 in some embodiments. In other embodiments, the graphic layer 600 may be fused with the top layer 700 by permeating the inks forming the graphics within the pores of the top layer 700. The top layer 700 having the graphic layer 600 fused or encapsulated therein may be bound or attached to the top surface of the second fiberglass layer 500 using an epoxy resin or adhesive. In some embodiments, the method may further include the step of filling the slots 117 with epoxy resin. The graphic layer 600 and the top layer 700 may be sized and shaped to cover the underneath layers nestled within the central recess 105 as well as cover any exposed areas of the unibody base layer's 100 tip 103, tail 101, top surface of the sidewalls 107*a*, 107*b* and the slots 117.

Once all the respective layers 100, 200, 300, 400, 500, 600 and 700 have been assembled, aligned and coated with the appropriate epoxy resin or other adhesive, embodiments of the method may further include the step of pressing the layers together with a pneumatic press under an appropriate amount of pressure and allowing the epoxy resin spread between the layers of the snowboard to cure. The pressing step may further be used to control the overall shape of the snowboard 10. When placing the snowboard 10 in the press for the pressing and curing steps, one or more forms may be used to shape the final product, including the unibody base layer 100 to the appropriate shape, such as a traditional camber, rocker (inverse camber) flat, a camber combination (flying V), all mountain rocker, freestyle camber or any other known shape a snowboard may be pressed into.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

The invention claimed is:

1. A snowboard comprised of:
    a unibody base layer having a tip, a tail, a first sidewall having an outer groove, a second sidewall having a second outer groove, a pair of locator pins and a central recess;
    a first edge attached to the outer groove of the first sidewall;
    a second edge attached to the outer groove of the second sidewall;
    a fiberglass layer, having a first bore and a second, inserted into the central recess, wherein the first bore and the second bore are aligned with the pair of locator pins; and
    a core layer attached to a top surface of the fiberglass layer, said core layer having a first core layer bore and a second core layer bore aligned with the pair of locator pins, wherein the pair of locator pins pass through the first bore, second bore, first core layer bore and the second core layer bore.

2. The snowboard of claim 1, further comprising a second layer of fiberglass sized to sit within the central recess is positioned above the core layer.

3. The snowboard of claim 1, further comprising a at least one of a graphic layer and a top layer, wherein said graphic layer and top layer are sized to extend from the tip to the tail of the unibody base layer and said graphic layer and top layer are positioned above the core layer.

4. The snowboard of claim 1, wherein the unibody base layer further comprises a plurality of slots positioned along the outside perimeter of the central recess.

5. The snowboard of claim 1, wherein unibody base layer is constructed from a single piece of ultra-high molecular weight (UHMW) polyethylene.

6. The snowboard of claim 5, wherein the unibody base layer is extruded, sintered, injection molded, routed, milled or laser die cut.

7. The snowboard of claim 1, wherein the central recess of the unibody base layer has a recess length formed by a distance between a first end and second end of the central recess, wherein the recess length is less than a length of the unibody base layer formed by a distance between the tip and the tail.

8. The unibody base layer of claim 7, further comprising a width measured from an exterior wall of the first sidewall to an exterior width of the second sidewall, and a recess waist measured from an interior wall of the first sidewall and an interior wall of the second sidewall.

9. The unibody base layer of claim 7, wherein the length of the unibody base layer is between 142-165 centimeters and the recess length is between 127-153 centimeters.

10. The unibody base layer of claim 7, wherein a ratio of the length of the unibody base layer to the recess length is between approximately 1.10:1.00 to 1.30:1.00.

11. The unibody base layer of claim 1, wherein the pair of locator pins are placed within the central recess.

12. A method for constructing a board sports device, comprising the steps of:
    providing a base layer material;
    conforming the base layer material into a unibody base layer having a central recess, a first sidewall, a second sidewall, an outer groove, a second outer groove and a pair of locator pins;
    inserting a fiberglass layer, having a first bore and a second bore into the central recess, aligning the first bore and second bore with the pair of locator pins;
    attaching a first edge to the outer groove and a second edge to a second outer groove; and
    attaching a core layer having a first core layer bore and a second core layer bore to a top surface of the fiberglass layer and aligning the first core layer bore and the second core layer bore with the pair of locator pins, wherein the pair of locator pins pass through the first bore, second bore, first core layer bore and second layer bore.

13. The method of claim 12, further comprising the steps of boring through the core layer to form a plurality of insert bores and feeding into each of plurality of insert bores, a threaded insert.

14. The method of claim 12, further comprising the steps of binding a second fiberglass layer over the core layer and aligning a pair of second fiberglass layer bores with the pair of locator pins and passing the pair of locator pins through the pair of second fiberglass layer bores.

15. The method of claim 14, further comprising the steps of:
    encapsulating or fusing a graphic layer within a top layer, wherein the graphic layer and top layer extends from the tip to the tail of the unibody base layer; and
    binding the top layer to the second fiberglass layer.

* * * * *

UNITED STATES PATENT AND TRADEMARK OFFICE
CERTIFICATE OF CORRECTION

PATENT NO. : 9,744,430 B2
APPLICATION NO. : 14/924250
DATED : August 29, 2017
INVENTOR(S) : Doug Hill et al.

It is certified that error appears in the above-identified patent and that said Letters Patent is hereby corrected as shown below:

In the Specification

Column 1, Line 12, delete "are coated" and insert -- is coated --

Column 3, Line 21, delete "layer may" and insert -- layer which may --

Column 3, Line 47, delete "manufacturer increase" and insert -- manufacturer to increase --

Column 3, Line 59, delete "tail 111" and insert -- tail 101 --

Column 4, Line 8, delete "thickness of" and insert -- thicknesses of --

Column 4, Line 36, delete "under on the" and insert -- under the --

Column 4, Line 42, delete "301" and insert -- 301a --

Column 5, Line 53, delete "may formed" and insert -- may be formed --

Column 5, Line 67, delete "tail will" and insert -- tail 101 will --

Column 6, Line 20, delete "tail 110" and insert -- tail 101 --

Column 6, Line 67, delete "tail 110" and insert -- tail 101 --

Column 7, Line 50, delete "Snowboard 10" and insert -- snowboard 10 --

Column 8, Line 18, delete "may have still have" and insert -- may still have --

Column 8, Line 19, delete "core tip," and insert -- core tip 403, --

Signed and Sealed this
Seventeenth Day of September, 2019

Andrei Iancu
*Director of the United States Patent and Trademark Office*

CERTIFICATE OF CORRECTION (continued)
U.S. Pat. No. 9,744,430 B2

Column 8, Line 48, delete "recess 105a" and insert -- recess 105 --

Column 8, Line 65-66, delete "core tail" and insert -- core tail 404 --

Column 9, Line 18, delete "be extend" and insert -- be extended --

Column 9, Line 43, delete "bores 403." and insert -- bores 402. --

Column 10, Line 5, delete "fiberglass 500" and insert -- fiberglass layer 500 --

Column 10, Line 9, delete "layer 400" and insert -- layer 500 --

Column 10, Line 11, delete "layer 400." and insert -- layer 500. --

Column 10, Line 59, delete "to the bind" and insert -- to bind --

Column 10, Line 60-61, delete "tip 101, tail 103" and insert -- tip 103, tail 101 --

Column 10, Line 67, delete "surface second" and insert -- surface of the second --

Column 11, Line 1, delete "tail 103, tip, 101" and insert -- tail 101, tip 103 --

Column 11, Line 25, delete "attached second" and insert -- attached to the second --

Column 12, Line 7, delete "inserting a threaded" and insert -- inserting threaded --

Column 12, Line 7, delete "into the each" and insert -- into each --

In the Claims

Column 13, Line 38, delete "comprising a at" and insert -- comprising at --

Column 13, Line 46, delete "wherein unibody" and insert -- wherein the unibody --